W. A. WILLIAMS.
BALLOON FABRIC AND THE LIKE.
APPLICATION FILED APR. 23, 1919.
1,427,708. Patented Aug. 29, 1922.
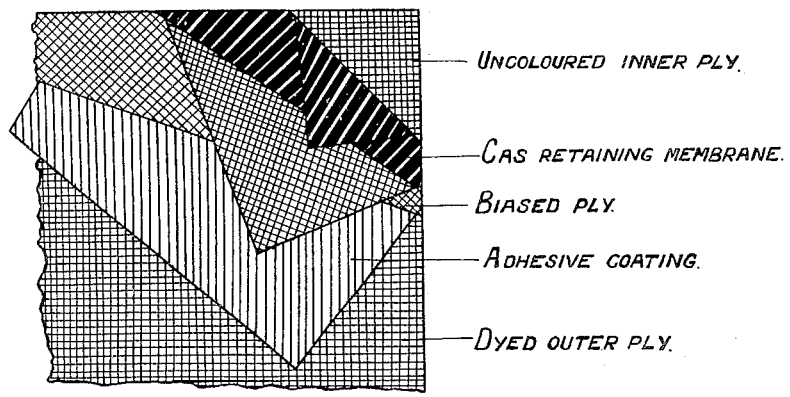
Uncoloured inner ply.
Gas retaining membrane.
Biased ply.
Adhesive coating.
Dyed outer ply.
Inventor
William Arthur Williams

UNITED STATES PATENT OFFICE.

WILLIAM ARTHUR WILLIAMS, OF EDINBURGH, SCOTLAND, ASSIGNOR TO THE NORTH BRITISH RUBBER COMPANY, LIMITED, OF EDINBURGH, SCOTLAND.

BALLOON FABRIC AND THE LIKE.

1,427,708.     Specification of Letters Patent.     Patented Aug. 29, 1922.

Application filed April 23, 1919. Serial No. 292,232.

(GRANTED UNDER THE PROVISIONS OF THE ACT OF MARCH 3, 1921, 41 STAT. L., 1313.)

*To all whom it may concern:*

Be it known that I, WILLIAM ARTHUR WILLIAMS, a subject of the King of the United Kingdom of Great Britain and Ireland, and resident of 19 Craiglockhart Terrace, Edinburgh, Scotland, have invented certain new and useful Improvements in Balloon Fabrics and the like, for which I have obtained Letters Patent of Great Britain No. 13689, dated September 27, 1915, and France No. 502,518, (application filed November 4, 1915), and of which the following is a specification.

In the manufacture of balloon fabrics as usually carried out, one, two or more plies of fabric manufactured from cotton, silk, or linen, or the like, are cemented together by means of rubber or other proofing; that ply which it is intended shall be exposed to weather being coloured yellow or orange. It is also customary in a two ply or three ply fabric to place the thickest layer of proofing, which constitutes the gas-proof membrane, in juxtaposition to and inside the coloured ply. The coloured exterior fabric prevents, to some extent, the lights of short wave length from reaching the gas-tight layer of proofing on which it has a detrimental effect; but, owing to the fact that light passes through the interstices of even a closely woven fabric, the proofing is gradually attacked and slowly perished, losing its gas-retaining qualities.

A balloon fabric according to the present invention is illustrated on the accompanying drawing, the various layers or coatings being shown folded down for the sake of clearness. It will be understood that the various layers or coatings are intimately united in the complete fabric.

According to the present invention, further protection is afforded the gas-proof layer in balloon fabrics and the like, constructed of three or more textile plies, by arranging that the light, before being incident upon the gas-proof membrane, is filtered by:—

1. The ply which it is intended shall form the exterior of the envelope, suitably coloured by means of dye, pigment, or other agent.

2. The intermediate ply, or the two or more intermediate plies, suitably coloured by means of dye, pigment or other agent.

In order that this invention may be clearly understood an example of a three ply fabric may be given:—

*Example.*—The three ply fabric may be constructed according to the following scheme:—

The envelope exterior ply is of parallel construction, and the two exterior plies are superimposed, warp upon warp and weft upon weft respectively, with an intermediate ply "biased" i. e., inclined with its warp and weft threads at an angle of about 45° to those of the exterior plies. The textile fabric employed is scoured cotton; the envelope exterior ply is coloured yellow with a suitable colouring matter fast to light and water; the intermediate ply is dyed red with a suitable colouring matter fast to light and water; whilst the envelope interior ply is left uncoloured. Between the envelope exterior ply and the bias ply is spread or otherwise applied, an adhesive coating consisting of about 1.5 ozs. of rubber to each square yard of surface, whilst between the bias ply and the envelope interior ply is applied the gas retaining membrane of about 3 ozs. of rubber to each square yard of surface. The whole combination is then vulcanized in the customary manner.

*Exterior of envelope.*

Exterior: *a.* Fast yellow colouring matter. *b.* Adhesive coating 1.5 ozs. per sq. yard.
Bias: *c.* Red dyed. *d.* Gas retaining membrane, 3 ozs. per sq. yard.
Interior: *e.* Scoured.

*Interior of envelope.*

Claim:

A balloon envelope fabric comprising a coloured outer textile ply, a coloured intermediate ply cemented thereto, an interior textile ply and a gas retaining membrane between the intermediate and interior plies.

Dated this 30th day of December, 1915.

WILLIAM ARTHUR WILLIAMS.

In presence of:
HELEN SUTHERLAND,
GEDDES WHITELAW.